US009542581B1

(12) United States Patent
Gehner

(10) Patent No.: US 9,542,581 B1
(45) Date of Patent: Jan. 10, 2017

(54) ASSET TRACKING SYSTEM

(71) Applicant: Wolfgang Gehner, Yucaipa, CA (US)

(72) Inventor: Wolfgang Gehner, Yucaipa, CA (US)

(*) Notice: Subject to any disclaimer, the term of this patent is extended or adjusted under 35 U.S.C. 154(b) by 0 days.

(21) Appl. No.: 14/843,599

(22) Filed: Sep. 2, 2015

(51) Int. Cl.
*G08B 13/14* (2006.01)
*G06K 7/10* (2006.01)
*G08B 13/24* (2006.01)

(52) U.S. Cl.
CPC ....... *G06K 7/10415* (2013.01); *G06K 7/10445* (2013.01); *G08B 13/2417* (2013.01)

(58) Field of Classification Search
CPC .............. G06K 2017/0045; G06K 7/10445; G06K 7/10316; G06K 7/10415; G06K 7/10425; G06K 7/10435; G08B 13/14; G08B 13/2417
See application file for complete search history.

(56) References Cited

U.S. PATENT DOCUMENTS

| 7,170,422 | B2* | 1/2007 | Nelson | G08C 19/28 340/10.32 |
| 7,466,232 | B2 | 12/2008 | Neuwirth | |
| 7,692,532 | B2* | 4/2010 | Fischer | G06K 7/0008 340/10.2 |
| 7,779,103 | B1* | 8/2010 | Fikes | G06F 21/6263 709/219 |
| 8,943,309 | B1* | 1/2015 | Schilder | H04L 9/00 713/155 |
| 2006/0022815 | A1* | 2/2006 | Fischer | G06K 7/0008 340/505 |
| 2006/0044147 | A1* | 3/2006 | Knox | G01S 3/32 340/686.1 |
| 2006/0282498 | A1* | 12/2006 | Muro | H04L 67/34 709/203 |

* cited by examiner

*Primary Examiner* — Van Trieu
(74) *Attorney, Agent, or Firm* — Triet Nguyen

(57) ABSTRACT

Embodiments of the subject technology provide a multi-tenant asset tracking system that disambiguates or filters RFID tags.

21 Claims, 11 Drawing Sheets

ASSET TRACKING SYSTEM

TECHNICAL FIELD

The present disclosure relates to computer networking, and more specifically to using RFID tags in a multi-tenanted asset tracking system.

BACKGROUND

Traditionally, an organization would use RFID (radio-frequency identification) tags, RFID tag readers and a data server to keep track of their assets and their physical locations while in their realm of control (e.g., buildings, yards, etc.). Asset information would be stored in a database either inside the organization's network, or, more recently, on a database in a virtual private network ("the cloud"), such database nevertheless being an information silo. However, "returnable" assets such as crates, kegs and other containers regularly leave the organization's realm of control, and as part of a delivery chain, enter realms of third parties, before hopefully being returned to the organization. Such third parties may be receiving returnable assets from yet other parties as well, or have their own asset tracking needs, in addition to collaborating with the first organization.

BRIEF DESCRIPTION OF THE DRAWINGS

Example embodiments will be described with reference to the accompanying drawings briefly described below.

DETAILED DESCRIPTION

Figure 1:
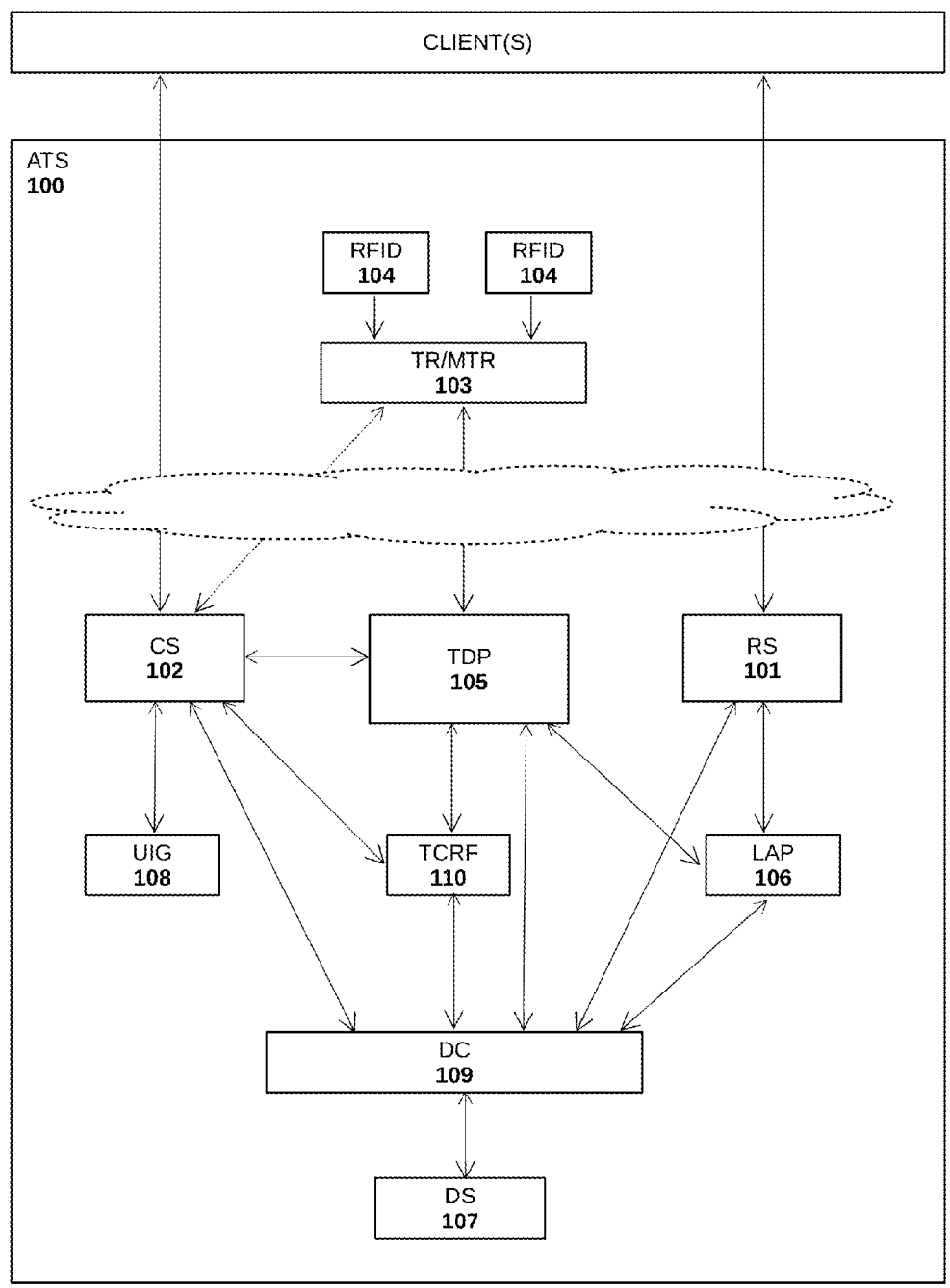
FIG. 1 conceptually illustrates an example block diagram of a system configuration in accordance with one embodiment.

In the following description, various embodiments are illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

A networked world using RFID needs new systems and methods to leverage that network by sharing infrastructure (such as tag readers) and/or information (such as location of tagged "things") among participants in the network. The present invention is making the step from siloed "address books" for physical assets to a "social network of things."

To achieve a social network of things, existing RFID asset tracking systems have to be modified and augmented to make them multi-tenanted, massively scalable, fault tolerant and easily configurable. Embodiments address these issues both individually and collectively.

Networks can be mapped as a graph which defines the relationships between entities. In a social network of people, people have friends, friends have posts etc.; in a social network of things, things are owned by and/or assigned to organizations, things have locations, organizations have partners, and more. Some locations (e.g., Room 237) may be private, others may be shared with partners (e.g., distribution centers). Some tag readers may be private, certain data from others may be shared with partner organizations.

In most cases, tag readers are capable of reading tags from multiple manufacturers as long as they share the same technology (e.g., passive tags, active tags). The tag ID codes inscribed on tags are usually defined by the organization. In many cases, these tag ID codes can be transcribed as 8 to 32-digit alphanumeric strings, while certain tags allow more complex tag ID codes.

Existing RFID asset tracking systems may implement rules such as "When a tag is read by reader R, move the tagged asset to location L". Rules similar to the aforementioned may present an issue in multi-tenant systems, where for two tenants T1 and T2, the reader R may be physically positioned in the supply chain of both tenants (such as in a logistics center), but only be part of the supply chain of tenant T1. An existing RFID asset tracking system would move any asset with a tag that was read to location L. However, the tagged asset should only be moved if it is part of the supply chain of tenant T1. Embodiments described herein address this issue which is becoming more pronounced with the proliferation of RFID tags.

Many disparate organizations tag their assets with codes like a0000001, a0000002, etc. Since beyond a single organization RFID tag ID codes can not be expected to be unique, multi-tenanted RFID systems have to be equipped to resolve tag ambiguity. While standards such as the Electronic Product Code (EPC) Tag Data Standard for making tag ID codes globally unique exist, they are neither mandatory nor universally adopted. Applying such a standard can also require paying licensing fees. Tag owners of the world are free to encode whatever tag ID codes they wish. While the provider of a multi-tenant system could theoretically enforce that all tags registered by subscribers must be unique across the system, this would not protect from confusion by reads of tags that are not registered with the system but whose ID codes happen to (or are made to) match tags that a subscriber has registered with the system. In a system that does not address this issue, one mistakenly read tag or batch of tags whose tag ID codes overlap with those of any subscriber can wrongly move assets across the globe, and quickly wreak havoc with the data in the system. Forcing organizations who migrate from a single-tenant to a multi-tenant system to adopt system-unique tag ID codes can potentially involve costly re-tagging of assets. Embodiments address the issue of a possible lack of tag uniqueness.

Existing RFID asset tracking systems may implement tag filters such as "Discard all reads where the tag ID code does not start with '1234'". Filters similar to the aforementioned may not be helpful in multi-tenant systems, where tag ID codes do not necessarily match a discrete list of patterns. Embodiments may address this issue by considering read context information (meta-data) in addition to information encoded on the tag when filtering tag reads.

In an embodiment, a configuration server (CS) node, a non-mobile or mobile tag reader (TR/MTR), a multitude of RFID tags (RFID), a read scope processor (RSP), a location action processor (LAP), a database server (DS) node and a report server (RS) node are provided. The CS node is configured to allow associating the TR/MTR to one or multiple principals. The RSP is configured to receive one or more data packets from a TR/MTR, which include the RFID tag ID code and context information. It is further configured to query the DS node for meta-data relating to the context information and receive such meta-data. The RSP is further configured to convert the tag ID code to a unique identifier based on such meta-data, and transmit such unique identifier to the LAP along with context information and meta-data. The LAP is configured to determine location information for the uniquely identified asset, evaluate whether the location(s) for this asset should be updated, and if so, transmit to the DS node the instruction to do so. The DS node is configured to update the location record(s) for the asset in the database. The LAP is also configured to execute other appropriate actions such as triggering email alerts.

In an embodiment that includes a data cache, a configuration server (CS) node, a non-mobile or mobile tag reader (TR/MTR), a multitude of RFID tags (RFID), a read scope processor (RSP), a location action processor (LAP) node, a data cache (DC) node, a database server (DS) node and a report server (RS) node are provided. The CS node is configured to allow associating the TR/MTR to one or multiple principals. The RSP is configured to receive one or more data packets from a TR/MTR, which include the RFID tag ID code and context information. It is further configured to query the DC node for meta-data relating to the context information and receive such meta-data. The RSP is further configured to convert the tag ID code to a unique identifier based on such meta-data, and transmit such unique identifier to the LAP along with context information and meta-data. The LAP is configured to determine location information for the uniquely identified asset, evaluate whether the location for this asset should be updated, and if so, transmit to the DS node the instruction to do so. The DS node is configured to update the location record for the asset in the database, and to inform the CD node that about the update. The LAP is also configured to execute other appropriate actions such as triggering email alerts.

Referring to FIG. 1, depicted is an example of an Asset Tracking System (ATS) 100 and examples of various related nodes. The ATS 100 has at least one of each of the following: configuration server (CS) node 102, report server (RS) node 101, one non-mobile or mobile tag reader (TR/MTR) 103, RFID tag (RFID) 104, read scope processor (RSP) 105, location action processor (LAP) node 106, and a database server (DS) node 107. The ATS 100 may further include at least one unique identifier generator (UIG) 108 and/or at least one data cache (DC) node 109 and/or at least one tag collision report filter (TCRF) 110.

A configuration server (CS) node 102 provides an interface used for configuring the system. A report server (RS) node 101 provides an interface used for extracting data from the system.

The interfaces provided by CS nodes 102 and RS nodes 101 can be visual interfaces that can be rendered in a browser for use by a human. Interfaces can also be application programming interfaces (APIs) that can be called by a machine, such as a mobile app or another software. In one embodiment, such calls are made using the HTTP protocol or secure versions thereof (such as HTTPS). In another embodiment, programming instructions are submitted to the CS node 102 using the FTP protocol.

In one embodiment, the identity of the human or machine caller is established in an authentication procedure. A CS node 102 and an RS node 101 may provide an HTML interface that can prompt the caller for credentials, such as an email in combination with a password. The prompt can be rendered in an HTML/browser interface. If credentials are found valid, the caller can be allowed access to further functions of the CS node 102 and/or the RS node 101. The CS node 102 and the RS node 101 may be configured to block access if authentication procedures for a caller fail repeatedly. If credentials for a human caller are found but are not found valid, the CS node 102/RS node 101 may lead the caller into a password recovery or reset procedure, which may include sending the caller an email with instructions to recover or reset a password. If credentials for a caller are not found, the CS node 102 may lead the caller to a registration procedure.

The CS node 102 and RS node 101 may be configured to use credential information stored in a browser (such as with a persistent cookie) or in a mobile app or another software client, obviating the need to provide authentication information upon accessing the CS node 102 and/or RS node 101.

The node responsible for executing the authentication procedure (CS node 102 or RS node 101) may interact with an authentication service, which may conform to the Open Authentication Standard version 2.0 (OAUTH2) or higher.

A database server (DS) node 107 can be used to store data persistently.

In a system where there are multiple DS nodes, each DS node may reside on a different physical device, and the same data may be stored on more than one DS node, so that data can be recovered in the event that one of the physical devices does not function. DS nodes may be configured to exchange data with each other so that one DS node can return data that physically resides on any other DS node. Other nodes may communicate with a DS node via a dispatcher (not shown in FIG. 1 or FIG. 2) that is configured to switch communication to another DS node when the first DS node fails to function, allowing the system to continue operating without interruption.

A data cache (DC) node 109 can be used by another node to cache data in memory for faster access. Any or all communication from other nodes may be to such DC node 109 instead of directly to a DS node 107. If the system contains more than one DC node 109, a DC node receiving communication is capable of communicating to the other DC nodes 109 if data in the data cache needs to be invalidated because it is stale. Data may be considered stale if an instruction has been given to modify or delete a data record or a record related to the stale data.

A unique identifier generator (UIG) node 108 can be called by other nodes in the system to generate unique identifiers (UIDs). In most examples, these calls originate from CS nodes 102. The UIG 108 may use an algorithm that generates each UID based on the timestamp of creation including milliseconds and the unique MAC address of the physical device on which it resides. In one example, the UIG may obtain a sequence or auto-increment ID from a relational database for use as UID. In a system that contains only one DS node 107, the DS node itself may be configured to provide a UID, such as a sequence or auto-increment ID in a relational database.

Figure 2:
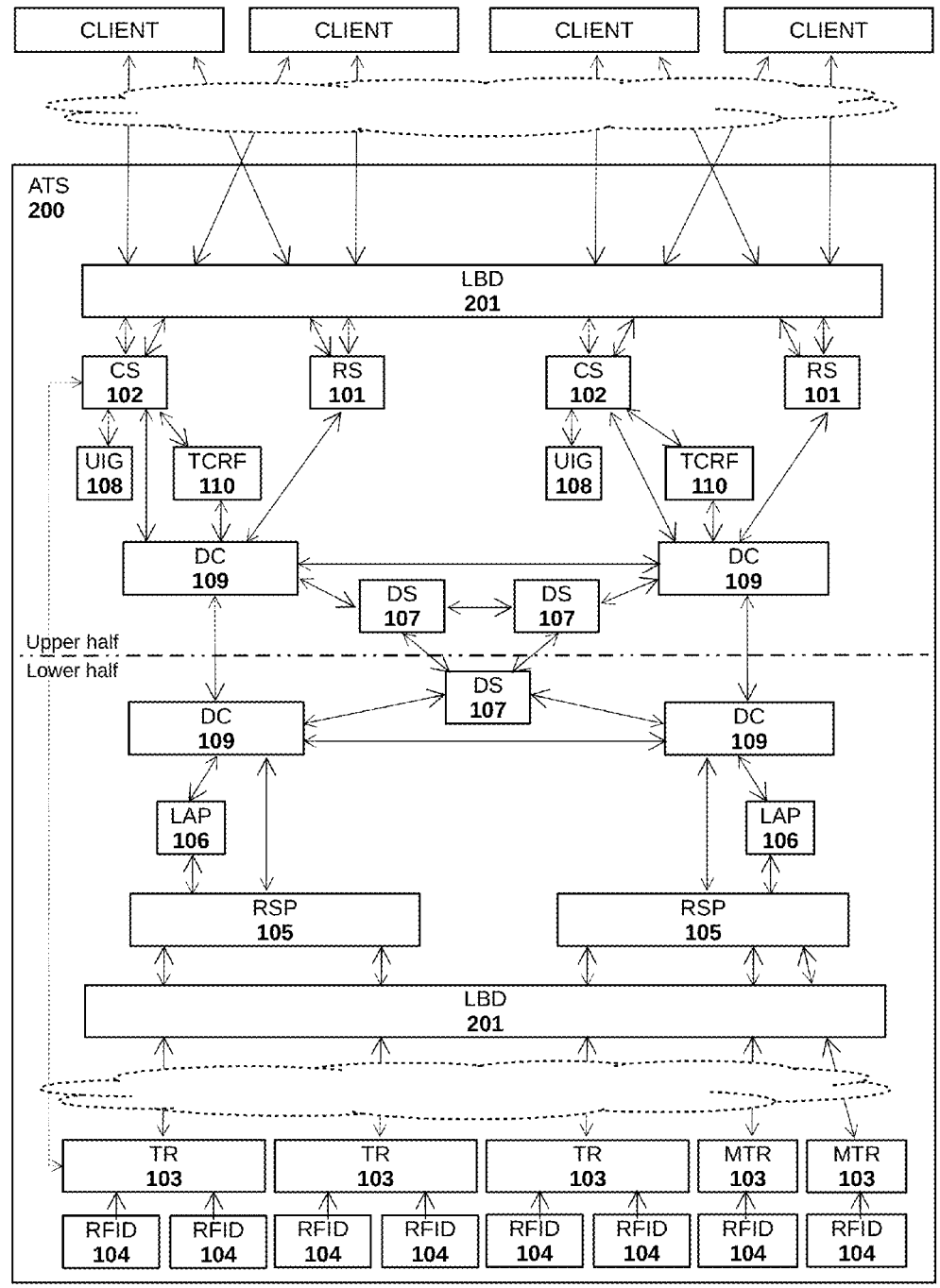
FIG. 2 conceptually illustrates an example block diagram of a system configuration, including multiple nodes that achieve high scalability and fault tolerance, in accordance with one embodiment.

FIG. 2 conceptually illustrates an advanced system configuration in additional detail that provides scalability and fault tolerance in accordance with at least one embodiment. The ability to scale is important for a multi-tenant asset tracking system. In an example operation, a single tenant (principal/organization) can be expected to introduce up to tens of thousands of asset tags, many of which may be read as often as every second. This creates substantial data traffic. Each tenant who introduces tagged assets creates additional processing and storage requirements for the system. The amount of data to be analyzed also places high demands on the processing capacity of reporting server (RS) nodes. For mission-critical asset tracking systems, fault tolerance is also important. In a system that relies on single components, a hard disk crash of a database server or report server can cause a costly disruption of an operation's core business. An operation that relies on billing its customers for returnable assets, for example, or one that uses asset location for a just-in-time receiving operation such as a car manufacturing plant can suffer severely from system downtime. The present invention addresses both the needs for scalability and fault tolerance.

Existing single-tenant Asset Tracking Systems provide one self-contained system that incorporates hardware or system resources, and software. In embodiments, shown by example in both FIG. 1 and FIG. 2, a DS node 107 is preferably configured to make available storage capacity accessible for the benefit of additional tenants. Likewise, the nodes that receive data from readers (RSPs 105) and nodes that face clients (namely CS nodes 102 and RS nodes 101) are configured to make their processing capacity accessible for the benefit of additional tenants. Computing resources such as processor hardware, hard disk space and memory are flexibly attributed to multiple tenants, and available network bandwidth is shared among multiple tenants. Since resources that are made available usually must be paid for, whether used, unused or underused, sharing such resources can have a significant cost benefit compared to when using multiple single-tenant systems where each individual system must be designed for peak usage. Peak system use times can be expected to vary between tenants, especially when they operate in different business domains and time zones. Therefore, the shown multi-tenant system is capable of using resources that would often be left unused in a collection of single-tenant systems.

The multi-tenant systems illustrated in FIG. 1 and FIG. 2 can also be more economical to administer than multiple single-tenant systems. This is because software fixes and enhancements have to be installed ("deployed") only on one system to benefit all tenants (rather than on each individual system). Because it is costly to upgrade single-tenant systems, providers of such systems often choose to selectively install upgrades for the benefit of certain tenants only, which may require multiple versions of the software. This can result in a significantly higher cost of software development, testing and maintenance per tenant, compared to the shown multi-tenant systems in FIG. 1 and FIG. 2.

The advanced system configuration shown in FIG. 2 can provide a high degree of fault-tolerance. Providing fault tolerance within a single-tenant system is costly because most components have to be doubled up but are only used at 50% (half) of their capacity in normal use (e.g., measured in processing capacity, hard disk space and access bandwidth use). FIG. 2 shows three DS nodes 107 that may reside on separate hard disks or storage devices. To provide tolerance of failure of a DS node 107, each DS node 107 can be configured to replicate data relating to a particular tenant to one other DS node 107. While three single-tenant systems would need a total of six replicating database nodes to achieve database fault tolerance, the shown multi-tenant system only needs a minimum of two physical DS nodes 107.

Referring to FIG. 2, the upper half of the advanced configuration is concerned with communicating data and commands with clients, some of whom may employ user interfaces such as web browsers for rendering display screens to system users. The lower half is concerned with receiving data from readers and executing appropriate actions that in most examples arise from location changes of tagged assets. This physical separation of concerns provides important convenience benefits to system users, because in the event that nodes in the lower half become fully occupied with processing sudden bursts of tag data, user interfaces can remain fast and snappy (responsive) and vital reports can continue to be delivered.

To achieve fault tolerance for CS nodes 102, RS nodes 101 and RSPs 105, communication from requestors (clients and TR/MTR nodes 103) to these nodes is managed by load balancer/dispatcher (LBD) nodes 201. A basic LBD node 201 monitors which nodes for the target node type of the request (e.g., CS, RS or RSP) are available ("up") vs. unavailable ("down") and dispatches data requests and commands to an available target node of the requested type. A LBD node 201 may be configured to choose the target node using a round-robin algorithm (or any other suitable algorithm including random selection, fastest response time, least connections, etc.). To establish which nodes are up, in one implementation, the LBD node 201 probes availability by sending a HTTP request to each node and listens for a response. A node can be considered down if it does not respond within an acceptable amount of time, which may be a predetermined value or configurable value. A LBD node 201 may keep track of information including an IP address of a respective requestor(s) or use another session-identifying mechanism (e.g., browser maintained cookies) and use this information to route subsequent requests from the same requestor to the same node. Also, an advanced LBD node 201 may be configured to dispatch (reroute) traffic to another available node of the same type (CS, RS, RSP) when the first node becomes unavailable during the course of a session ("transparent" fail-over).

Scalability is an important benefit of the present invention. A system that is configured following the concepts described for FIG. 2 can be extremely scalable. While FIG. 2 only shows two RSPs, three DS nodes and two CS and RS nodes each, the system can be configured with a virtually unlimited multitude of further nodes of each type (three or more RSPs, three or more CS or RS nodes, etc.), in order to support virtually unlimited multitudes of tags and tenants.

The system can be further scaled by using multiple LBD nodes 201. In one configuration, subdomains can be used to address individual LBD nodes 201. For example, the system can be configured that requests to us.rfidthings.com are directed to LBD "A", and requests to uk.rfidthings.com are directed to LBD "B". This can be achieved by configuring the DNS server responsible for translating domain names to IP addresses.

ATS 200 may be geographically distributed in at least an embodiment. For example, one RS node 101 each may be residing in a data center on the East coast, Central or West coast of the United States. Each such node will usually be accompanied by a DC node 109, and alternatively with a CS node 102, UIG node 108 and TCRF node 110. When such geographic distribution brings the RS node 101 (or CS node 102) closer to the client, this can improve the responsiveness of the user interface for the client.

The system can be further scaled when it is paired with a Content Delivery Network (CDN). A CDN places static content that is usually rendered as part of user interfaces (e.g., images or static text) on caching servers that are often geographically distributed, and thus can deliver the content through the Internet with faster response times. By using the CDN, the load from CS and/or DS nodes may be reduced which frees them to handle more processing requests that relate to dynamic data.

The system can also be further scaled when it is paired with an API/RPC Delivery Network (sometimes referred to as Data Delivery Network or DDN). A DDN intercepts requests and commands for dynamic data (usually made by machine callers, which are often apps installed on mobile phones) and responds with cached data if possible. The asset tracking system can be configured for such DDN to communicate with CS nodes 102 and RS nodes 101 to obtain such dynamic data and send commands, and alternatively through a LBD node 201 in some examples. This frees the CS and/or DS nodes to handle more processing requests that relate to dynamic data but that can not suitably be cached (such as insert or update requests). The system may be configured to use sub-domains (e.g., rsddn.rfidthings.com, lbddn.rfidthings.com) to provide routes to dedicated nodes for the DDN to communicate with.

A DS node 107 can be configured to store a list of principals. A principal can represent an organization, supply chain, workflow or other unit, entity or grouping. A principal may also represent an entity that may be billed for services provided by the system. A principal can be uniquely identified with a principal identifier, such as an account number. A CS node 102 may provide an interface to allow submitting such principal identifier to the DS node 107. A CS node 102 may query a DS node 107 to ensure that the submitted principal identifier is unique in the system. A DS node 107 may be configured to disallow duplicate principal identifiers. In one embodiment, the CS node 102 obtains the unique principal identifier from a UIG node 108.

A DS node 107 can also be configured to store profile information associated to the principal. Such profile information may include relationships to other principals. It may also include the nature of such relationships, such as "network partner", "supplier", client", or "parent organization". A CS node 102 may provide an interface to allow adding and/or removing such association or associations between principals.

A DS node 107 can be configured to store a list of human and/or machine caller entities. A caller entity can represent a person, machine, access credential or access profile. A caller can be uniquely identified with a caller identifier, such as email address, phone number, username, UID or URI (Uniform Resource Identifier, as defined by the Internet Engineering Task Force IETF in RFC 3986 including updates thereof), or a combination of any of these among each other or with a principal identifier. A CS node 102 may provide an interface to allow submitting such caller identifier to a DS node 107. A CS node 102 may query the DS node 107 to ensure that the submitted caller identifier is unique in the system. The DS node 107 may be configured to disallow duplicate caller identifiers. In one embodiment, the unique caller identifier is obtained from a UIG node 108.

A DS node 107 can also be configured to store a list of associations of caller entities with principals. A caller entity may be associated with one or more principals, and a principal may be associated with one or more caller entities. A CS node 102 may provide an interface to allow adding and/or removing such association or associations between caller entity and principal.

A CS node 102 may be configured to allow a human registrant to register as a caller of the system. The registration procedure can include input parameters such as first name, last name, email address, phone number of the human registrant, username, password, and principal identifier (if known). If the principal identifier is unknown, a CS node 102 may be configured to create a new principal identifier during the registration process, and to instruct a DS node 107 to store the newly created caller entity, the newly created principal, and the association between them.

A CS node 102 may be configured to allow attributing to a caller entity a role or a set of permissions that allow or deny the caller rights to execute administrative or managerial actions related to the system, such as the right to invite other prospective registrants to be associated with the principal, modify information about existing callers and set their roles or sets of permissions, configure non-mobile or mobile tag reader TR/MTR nodes 103, and/or define locations. During a registration procedure, these roles or sets of permissions may inherit from settings stored in the DS node 107. The CS node 102 may be configured to allow overriding inherited roles or sets of permissions.

A CS node 102 may be configured to send an invitation email to a prospective registrant. The email may contain a URL that includes at least one code that conveys information about the caller or principal with which the prospective registrant is to be associated. For example, the URL http://www.rfidthings.com/register?accountId=12345 may be used to convey to the registration process that the caller registrant is to be associated with the principal that is uniquely identified by the principal identifier 12345. In another example, the URL http://acme.rfidthings.com/register may be used to convey that the caller registrant is to be associated with the principal named "acme".

A CS node 102 may be configured to validate that a prospective registrant is not already registered, by querying a DS node 107 for unique credential key items such as email address, phone number or username. Such query may combine the query item or items with the principal identifier if known. If a prospective registrant is found to already have registered, the CS node 102 may transmit a warning message and the registration process may be interrupted, and replaced by an authentication process. If the registrant has already provided a password, and it matches existing credentials, the registrant may be allowed to access further functions of CS node 102, and may also receive an information message.

A CS node 102 may be configured to allow a machine to register one or more callers to the system using a call or calls to an Application Programming interface (API). API calls may be subjected to an authentication procedure. A CS node 102 may also be configured to allow a machine to unregister or deactivate one or more more callers to the system using API calls.

A DS node 107 can also be configured to store a list of location entities. A location entity can represent a logical physical location, such as Room 237 or a reference to a building or facility, including name and/or address. A location can be uniquely identified with a location identifier, such as UID, URI; or a combination of latitude and longitude; or a location name, x/y coordinates or x/y/z coordinates in combination with a principal identifier. A CS node 102 may provide an interface to allow adding, configuring, activating, deactivating, or deleting such location entity, with the CS node 02 submitting related data, commands and configuration parameters to a DS node 107.

A DS node 107 can also be configured to store a list of associations of location entities with principals. A location entity may be associated with one or more principals, and a principal may be associated with one or more location entities. A CS node 102 may provide an interface to allow adding and/or removing such association or associations between location entity and principal.

A DS node 107 can also be configured to store the scope of information sharing related to one or more location entities. Scope options may include "share my locations with (a) all my network partners, or (b) designated network partners, (c) all my suppliers, (d) designated suppliers, (e) all my clients, (f) designated clients, (g) none of the above, or (h) anyone". Scope options may be stored globally for all location entities associated to a principal. Scope options may also be set individually per location entity. Scope options may inherit from globally stored settings, and may be overridden for a location entity. Scope options may be differentiated by function. For example, valid functions can be "allow network partners to see the address", or "allow network partners to place assets into this location". A CS node 102 may provide an interface to allow setting such scope options.

A DS node 107 can also be configured to store a list of associations of location entities with other location entities. The nature of the association may be hierarchical, for example, Room 237 is in (a child of) Building B, or Building B is part of (a child of) the Facility A which has a distinct street address. A CS node 102 may provide an interface to allow adding and/or removing such association or associations between location entities.

A CS node 102 may be configured to provide a location registration process ("location wizard") to configure or add a location entity to the system. The location wizard may prompt for location information such as name, address or latitude/longitude, or location type (such as room, facility). When rendered in a browser, the location wizard may use location information available through the browser to resolve the browser location to an address. The location wizard may provide a visualization of the location on a map that may show a marker at the latitude and longitude of the identified location.

A DS node 107 can also be configured to store a list of RFID tag reader entities. A reader entity can represent a non-mobile or mobile RFID tag reader 103. A reader can be uniquely identified with a reader identifier, such as reader name, IP address, UID or URI (Uniform Resource Identifier, as defined by the Internet Engineering Task Force IETF in RFC 3986 including updates thereof), or a combination of any of these among each other or with a principal identifier. A CS node 102 may provide an interface to allow adding, configuring, activating, deactivating, or deleting such reader entity, with the CS node 102 submitting related data, commands and configuration parameters to a DS node 107.

A reader 103 may have one or more antennas attached to it. A DS node 107 can also be configured to store a list of antenna identifiers for the RFID tag reader entity. The identifier may be an increment integer.

A DS node 107 can be configured to store a list of associations of reader entities with principals. A reader entity may be associated with one or more principals, and a principal may be associated with one or more reader entities. A CS node 102 may provide an interface to allow adding and/or removing such association between reader entity and principal. A separate association may be made for each antenna identifier of the reader entity.

A DS node 107 can also be configured to store the scope of information sharing related to one or more reader entities associated to a principal. Scope options may include "share my reads with (a) all my network partners, or (b) designated network partners, (c) all my suppliers, (d) designated suppliers, (e) all my clients, (f) designated clients, (g) none of the above, or (h) anyone". Scope options may stored globally for all reader entities associated to a principal. Scope options may also be set individually per reader entity. Scope options may inherit from globally stored settings, and may be overridden for a reader entity. Scope options may be differentiated by function. For example, valid functions can be "share reads only for assets associated to the network partner", or "allow network partners to associate their own location entities to this reader". A CS node 102 may provide an interface to allow setting such scope options.

A CS node 102 may be configured to provide a reader registration process ("reader wizard") to register a RFID tag reader 103 with the system. The reader wizard may prompt for reader information such as manufacturer, model or model range, reader IP address, antenna identifiers and connection parameters such as access credentials. The reader wizard may propose connection parameters and instructions to configure the reader, such as IP address and connection port where the system is listening. The reader wizard may provide visual cues when a reader is successfully registered and the system receives communication from the reader. In an example, a CS node 102 may be communicating with a RFID tag reader 103 for configuration purposes. One such line of communication is indicated by a dotted line in FIG. 1 and FIG. 2.

A DS node 107 can also be configured to store a list of asset entities. An asset entity can represent a physical item to be tracked. A physical item may have one or more RFID tags 104 attached to it. An asset can be uniquely identified with a combination of tag ID code and asset principal identifier. A CS node 102 may provide an interface to allow adding, configuring, activating, decommissioning, or deleting such asset entity or entities, with the CS node 102 submitting related data, commands and parameters to a DS node 107.

A DS node 107 can be configured to store one or more lists of associations of asset entities with principals. An asset entity can be associated with more than one principal. One or more such associations may represent an ownership relationship. One or more such associations may represent a lease, loan or other assignment relationship. An asset entity may be associated with one or more principals, and a principal may be associated with one or more asset entities. A CS node 102 may provide an interface to allow adding and/or removing such association or associations between asset entity and principal.

A Tag Collision Report Filter (TCRF) node 110 can be configured to validate that a tag ID code submitted to it along with a principal identifier is not ambiguous in the system. To validate, the TCRF node 110 can query a DS node 108 for asset entities whose tag ID code match the submitted tag ID code and whose principals related to such asset's principal or principals match the submitted principal. The TCRF node 108 can respond to a validation call with a positive or negative affirmation. The response may include further information about which asset and/or which principal would be causing the ambiguity.

Prior to submitting a command to a DS node 107 to store the tag ID code of an asset, a CS node 102 can call a TCRF node 110 first to validate that its combination of tag ID code and principal identifier is not ambiguous in the system. When the request to store the tag ID code originated from a visual interface, the CS node 102 may provide a visual cue indicating whether a response from the TCRF node 110 is negative. The DS node 107 can be configured to disallow storing such an ambiguous tag ID code, or the CS node 102 can be configured to abort the storage command. When the request to store the tag ID code originated from a machine call to an interface, the CS node 102 may respond with an alert message to indicate when storage has been aborted, and/or the CS node 102 may also be configured to send an alert email message. A CS node 102 may be configured to allow designating one or more callers as message recipient.

Prior to submitting a command to a DS node 107 to add a principal to principal (or principal to reader) relationship, a CS node 102 can call a TCRF node 110 first to validate that such relationship would not lead to any combination of tag ID code and principal identifier that would be ambiguous in the system. When the request to add a relationship originated from a visual interface, the CS node 102 may provide a visual cue indicating whether a response from the TCRF node is negative. The DS node 107 can be configured to disallow storing such an offending relationship, or the CS node 102 can be configured to abort the storage command. When the request to add a relationship originated from a machine call, the CS node 102 may respond with an alert message to indicate when storage has been aborted, and/or the CS node 102 may also be configured to send an alert email message. A CS node 102 may be configured to allow designating one or more callers as message recipient.

A DS node 107 can be configured to store one or more lists of associations of asset entities with caller entities. An asset entity can be associated with more than one caller entity. One or more such associations may represent an assignment relationship. An asset entity may be associated with one or more caller entities, and a caller entity may be associated with one or more asset entities. A CS node 102 may provide an interface to allow adding and/or removing such association or associations between asset entity and caller entity.

A CS node 102 may be configured to provide an asset registration process ("asset wizard") to register an asset with the system. The asset wizard may prompt for asset information such as name, description, and tag RFID code or codes. The asset wizard may propose default information, such as a default name, description, current location, asset class or manufacturer. The asset wizard may provide visual cues when an asset is successfully registered.

The RFID tag reader 103 communicates with an RFID tag 104 on one or several wireless frequencies and obtains its tag ID code. A read scope processor RSP 105 receives the tag ID code from the RFID tag reader 103. In one embodiment, the LLRP protocol is used for this communication. The communication includes context information, such as an envelope, header or source information, which contains a reader identifier that can be used to identify the reader 103. If there is more than one antenna attached to the reader, the communication may include the antenna identifier.

In an embodiment, the RSP 105 may be implemented as a specialized or custom processor, ASIC (application-specific integrated circuit), FPGA (field-programmable gate array), embedded processor, etc. In another embodiment, the RSP 105 may be implemented as software and/or a combination of software and hardware.

In an embodiment, RSP 105 receives in the context information a reader identifier. In one preferred embodiment, the reader identifier is the IP address of a non-mobile reader 103 which is unique across the system. In another embodiment, the IP address is useful to help obtain a unique reference to the reader, along with reader name or other useful context information. In another embodiment, the context information outright contains another unique reader identifier.

Figure 3A:
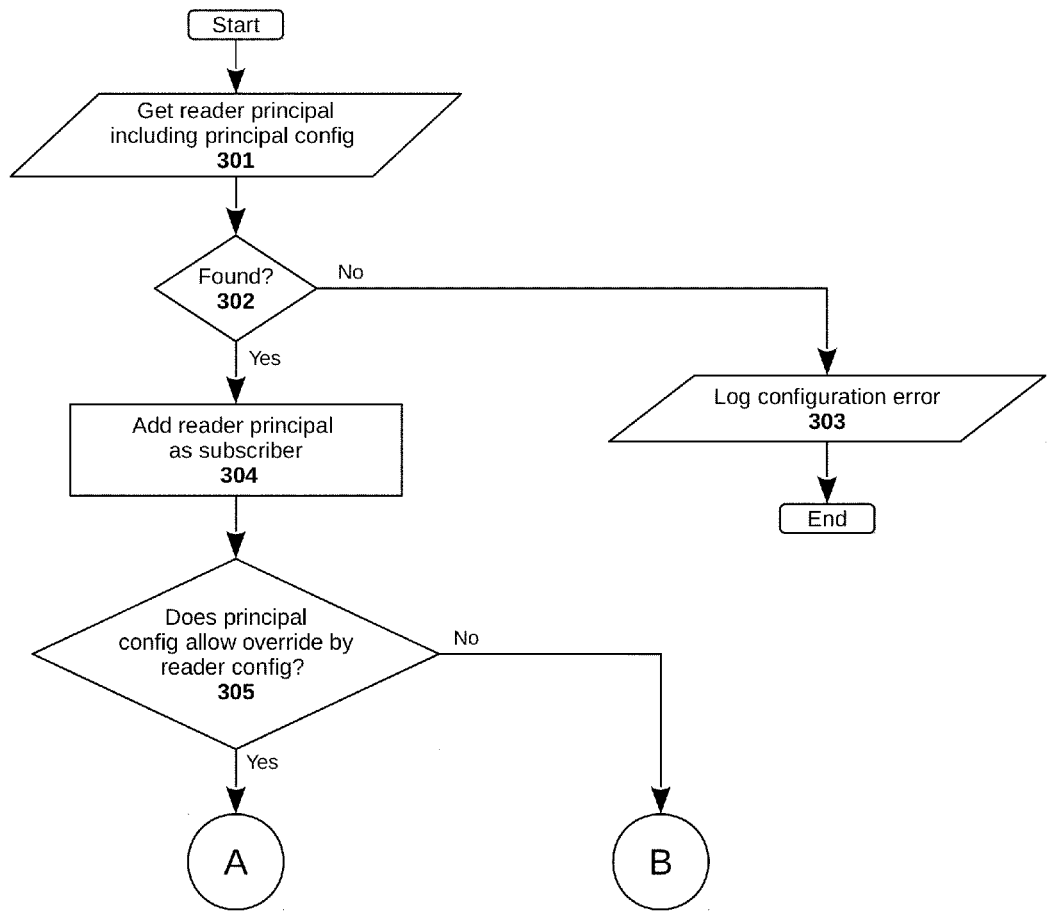
FIGS. 3A and 3B conceptually illustrate examples of processes performed by a read scope processor in accordance with at least one embodiment.
Figure 3B:
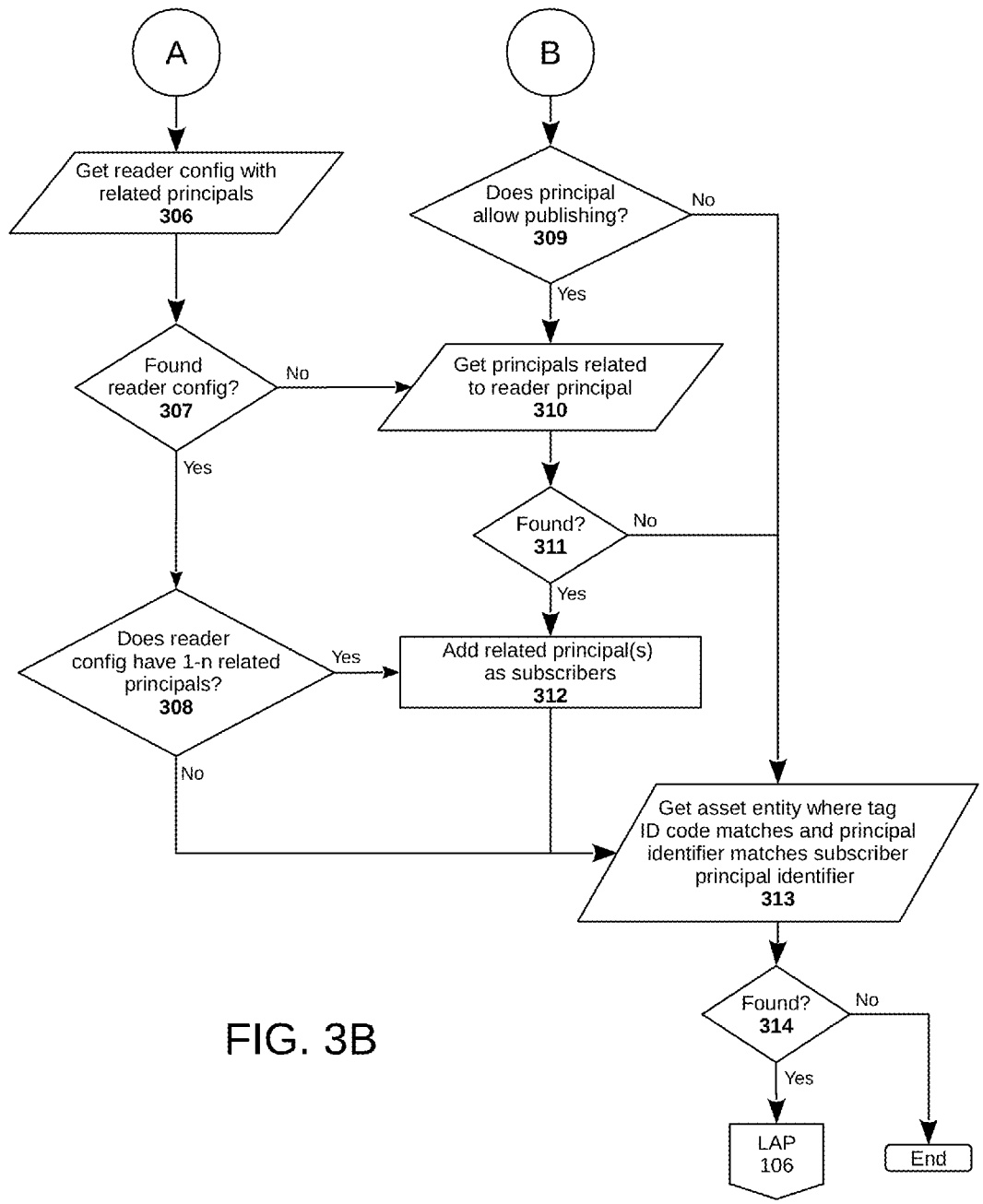

The detailed processing and operations performed by the RSP 105 is shown in example processes illustrated in FIG. 3A and FIG. 3B. Although these figures may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments.

In step 301, the RSP 105 queries a DS node 107 (or a cache DC node 108 when provided) using the context information to obtain a dataset for the reader's principal. The dataset will include the unique identifier of the reader's principal and, in some instances, configuration data ("principal config"). The principal config may include a yes/no (or true/false) boolean flag to indicate whether the configuration data specified for the principal may be overridden by configuration data that has been configured for an individual reader entity ("reader config"). If the flag is set to yes, the principal config is said to allow override by reader configs. The configuration data may also include a boolean flag to indicate whether this principal allows for data to be shared with ("published to") other principals ("subscribers") to the system.

In one example, the reader identifier encodes the reader principal. For example, the reader identifier is "reader1.234.1" where 234 matches or resolves to the unique identifier of the reader's principal. While a system may encode more than one reader principal in the identifier, in at least some examples this will be impractical, as the length or character set of a reader identifier may be limited by the reader 103 hardware, firmware or software. Other embodiments may have other ways to encode the reader's principal and/or principal relations of the reader in the reader identifier. However, since such principal relations can be expected to change over time, and readers may be hard to configure, this is deemed impractical for most examples of a networked asset tracking system. An embodiment stores the unique identifier of the reader's principal and principal relations in a DS node 107 and maintains it in a cache DC node 108.

In one example, there is one LBD node 201 dedicated and mapped to each principal and the readers associated to such principal. For example, the domain name of the LBD node 201 for the principal with the name "acme" is acme.lb-d.rfidthings.com. The RSP 105 is configured to resolve the mapping to the unique identifier of the mapped principal. However, this is deemed inefficient for most examples because LBD node resources are not shared between tenants of the multi-tenant system and thus more likely to be underused. In an example that does not use LBD nodes, there can be one RSP 105 dedicated and mapped to each principal and the readers associated to such principal. However, because RSP resources are not shared between tenants this is also deemed inefficient for most examples.

In step 302, the RSP 105 checks whether a dataset for the reader principal has been found. If the dataset has been found, the RSP 105 proceeds to step 304. In step 304, the RSP 105 creates an empty list. The purpose of the list is to hold references to reader principals, where the principals are considered subscribers to the reads received by the RSP 105. The RSP 105 stores a reference to the reader principal found in step 301, along with any configuration data found in the list. The list itself may be stored in memory of the hardware device on which the RSP 105 resides; however it is appreciated that in alternate embodiments the list may be stored in other locations.

Alternatively, if no reader principal has been found in step 302, the RSP 105 proceeds to step 303. A reader that has no principal is not fully configured and, as a result, not useful for processing in the system. If configured, the RSP 105 stores this invalid state as an error in a log. In at least some cases, the log will be represented by an entity in a DS node 107. When step 403 has been completed, the process shown in FIG. 3*a* performed by the RSP 105 may end.

When step 304 is complete, the RSP 105 proceeds to step 305. Depending on the result of the operation in step 305, the RSP 105 will continue to FIG. 3B. In step 305, if a principal config includes the flag to allow override by reader config and the flag is set to yes or true, the RSP 105 proceeds to the next step in FIG. 3B (illustrated as "A"). Otherwise, the RSP 105 proceeds to perform the next step (illustrated as "B") in FIG. 3B.

FIG. 3B conceptually illustrates an example process that the RSP 105 may perform continuing from FIG. 3A (e.g., from step 305). As described above, if a principal config includes the flag to allow override by reader config and the flag is set to yes or true, the RSP 105 proceeds to step 306 in FIG. 3B. A subscriber who has this flag set to true has more flexibility in processing reads than one who does not. For example, a reader config for a particular reader may be set so that reads from this reader are not published to other subscribers, and thereby kept as "private" reads, which are only to be processed for the benefit of callers associated with the reader principal. In some examples, this may be the default setting. A reader config may also be set so that reads from this reader are published to certain subscribers only in an embodiment, where the list of subscribers can be more restrictive than the "default" list of subscribers defined by the principal config.

In step 306 (which continues from step 305 from FIG. 3A), the RSP 105 queries a DS node 107 (or a cache DC node 108 when provided) using the unique identifier for the reader to obtain the reader config. The reader config may contain a list of references to principals associated to the reader ("related principals"). In this list, a principal may be directly identified by a principal unique identifier. The reader config may also indirectly specify a group of related principals by relationship type or types, such as "all customers" and/or "all suppliers". In this case, the RSP 105 queries a DS node 107 (or a cache DC node 108 when available) to obtain the references to the principals matching the relationship type or types. Some examples of relationship types may include "customer", "supplier" and "network partner". The result of the query or queries in step 306 is either that no reader config has been found or that a found reader config has yielded a list of related principals. The list of related principals may have 0 to n number of entries. The list may have 0 entries when no related principal has been directly identified and when an indirectly specified group of related principals has no group members at the time of the query.

In step 307, if the RSP 105 has found a reader config, it proceeds to step 308. For the purposes of this step, the existence of a reader config indicates that the principal config is not to be used to identify subscribers for this read, and as a consequence this reader config is to take precedence over the principal config even when this reader config yields no related principals (subscribers). Otherwise, if the reader config is not found, the RSP 105 proceeds to step 310.

In step 308, the RSP 105 determines whether the reader config has 1 to n related principals. When this determination is true, the RSP 105 proceeds to step 312. Otherwise, the RSP 105 proceeds to step 313.

In step 309 (which continues from step 305 from FIG. 3A) after it had been determined that the principal config does not allow override by reader config), the RSP 105 checks if the principal config (obtained in step 301 in FIG. 3A) includes a yes or true boolean flag to indicate that the reader principal allows for reads to be published to other principals/subscribers. If the principal does allow such publishing, the RSP 105 proceeds to step 310. If not, the reader principal remains the only subscriber in the list generated in step 304 from FIG. 3A, and the RSP 105 proceeds to step 313.

The principal config as stored in a DS node 107 may contain a list of references to principals associated to the principal ("principal relations"). In one example, the list may refer to all network partners of a principal (organization).

In step 310, the RSP 105 obtains this list of principal relations by querying a DS node 107 (or a cache DC node 108 if provided). This list may be specifically defined for the purposes of publishing reads by readers of the principal. In this list, a principal may be directly identified by a principal unique identifier. The principal config may also indirectly specify a group of principal relations by relationship type or types, such as "all customers" and/or "all suppliers". In this case, the RSP 105 queries a DS node 107 (or a cache DC node 108 if provided) to obtain the references to the principals matching the relationship type or types. The end result of step 310 is a list of principal relations, including each principal's unique identifier (principal identifier).

In step 311, the RSP 105 tests whether one or more principal relations have been found. If one or more principal relations have been found, the RSP 105 proceeds to step 312. If no principal relations are found, the RSP 105 proceeds to step 313.

In step 312, any principals found in steps 308 or 311 are added to the list of subscribers that was first created in step 304 in FIG. 3A. If no principals were found in steps 308 or 311, the list will still contain one entry for the reader principal as subscriber, populated in step 304 in FIG. 3A. The RSP 105 then proceeds to step 313.

In step 313, the RSP 105 queries a DS node 107 (or cache DC node 108 if provided) for an asset entity where the tag ID code of the asset entity matches the tag ID code of the tag being processed and a principal identifier of the asset entity matches the principal identifier of a subscriber in the list of subscribers.

In step 314, if such asset entity is found, the RSP 105 transmits the reference to the uniquely identified asset to a location action processor (LAP) node 106 for further processing, along with the list of subscribers, context information and other information collected during processing as may be useful for the LAP node 106. If no such asset entity is found, processing of the tag read ends.

A DS node 107 can be configured to store a list of associations of reader entities with location entities. A location entity may be associated with one or more reader entities. A CS node 102 may provide an interface to allow adding and/or removing such association or associations between location entity and reader entities. This interface may also be part of a location wizard or reader wizard. If the reader 103 has multiple antennas, a separate association may be made for each antenna identifier of the reader entity.

An RS node 101 may call a DS node 07 to obtain a list of location entities. The RS node 101 may provide an interface to provide the list of location entities to a client, such as a mobile app or client software. The RS node 101 may be configured to filter the list prior to providing it. For example, when the client is connected to a mobile tag reader MTR 103, the RS node 101 may provide only those location entities that are associated to the reader entity, or only those location entities that are associated to a principal where the reader entity is associated to the same principal. If the client has provided query criteria, such as GPS coordinates of the reader or client, or other two-or three-dimensional coordinates, the RS node 101 may be configured to return a list of location entities that match or most closely match these criteria. A DS node 107 may be configured to store delimiters around the coordinates or matching thresholds. The CS node 102 may provide an interface to allow setting such delimiters or matching thresholds.

A Location Action Processor (LAP) 106 is configured to resolve which location(s) a uniquely identified asset should be moved to in the system, and to execute actions that may be appropriate as a consequence of an asset's RFID tag having been read. Such actions will in many cases include updating the location information for the asset in a DS node, but may also include triggering an email alert, provide an information update to a client or another software, change certain attributes of the asset (e.g., set asset status to "Shipped" or "Received"), log a history record, and other actions. In an embodiment, the LAP 105 may be implemented as a specialized or custom processor, ASIC, FPGA, embedded processor, etc. In another embodiment, the LAP 106 may be implemented as software and/or a combination of software and hardware.

In one example, a LAP 106 is configured to execute rules that define which actions are to be taken under which conditions. In an embodiment, such rules may be provided using a programming language such as Java®. A LAP 106 is configured to allow updating the code which embodies the rules. A LAP 106 may have to be temporarily shut down while such update takes place. In most cases, such compiled rules will have variable input parameter variables. Such variables may include data received from the RSP 105. In more advanced embodiments, such rules may also have been coded in a scripting language, such as JavaScript, MVEL (MVFLEX Expression Language) or OGNL (Object-Graph Navigation Language). The advantage of defining certain or all LAP rules in a scripting language is that rules can be modified or used without a temporary shutdown or interruption of the operation of the LAP. Thus, rules therefore may be configured and used on a dynamic basis in at least an embodiment.

Some LAP rules may include "command-style" rules. A command-style rule responds to commands that carry precise instructions as to what actions are to be executed. For example, a mobile tag reader with a user interface displaying a list of locations (which may be user-selected or chosen) may be transmitting a command to a RSP 105 that signifies that an asset with RFID tag a000001 was read by mobile reader 1234 at the chosen location "Warehouse", and the user of the mobile reader issued a "move" command in order to signal that the uniquely identified asset is to be moved to that chosen location in the system.

Some LAP rules may include "reader-mapped" rules. A reader-mapped rule responds to data based on which reader (and/or which reader antenna) read the tag. An example of a reader-mapped rule is "When a tag is read by reader 2345, move the uniquely identified asset to location B in the system". Thus, it is appreciated that other actions may be performed in response to a given tag being read by a respective reader and/or reader antenna and still within the scope of the subject technology.

Some LAP rules may include "spatial" rules. A spatial rule responds to an event based on coordinate information. An example of a spatial rule is "When a tag is read within 10 feet of latitude a and longitude b, move the uniquely identified asset to location C in the system". Thus, a given spatial rule may include an action in response to a tag being read within a distance threshold (e.g., 10 feet).

Some LAP rules may include "direction-dependent" rules. Such rules can be useful at physical portals such as gates or doors. An example of a direction-dependent rule is "When a tag is read by reader 123.0 and subsequently (within 30 seconds) read by reader 123.1, move the uniquely identified asset to location "Warehouse". When a tag is read by reader 123.1 and subsequently (within 30 seconds) read by reader 123.0, move the uniquely identified asset to location "Yard".

Some LAP rules may include "temporal-dependent" rules. Such rules may be applied in conjunction with the aforementioned direction-dependent rule and/or spatial rule to trigger an action in response to an event occurring within a time period or temporal threshold. For example, as discussed above, when a tag is read within a period of time (e.g., thirty seconds) at a second location after initially being read at a first location, some action may be triggered. In this example, a combination of spatial, direction-dependent and temporal-dependent rules are used. Thus, it is appreciated that any of the LAP rules described herein may be used in any combination with each other.

In one example, LAP rules may contain multiple conditions and/or multiple outcomes. An example of this is "When an asset is read at the 'Wash' location and the asset status is 'Dirty', set its location to 'Storage' and the asset status to 'Clean'".

A CS node 102 may provide an interface to allow adding, configuring, activating, deactivating, deleting and assigning a priority or ranking to LAP rules, with the CS node 102 submitting related data, commands and configuration parameters to a DS node 107. The interface may include a "validate" button or command, which when invoked, performs a set of operations to validate one or more LAP rules. If upon receipt of a command to save a rule or upon execution of the validation, the CS node 102 finds that the proposed rule is syntactically or otherwise incorrect, the CS node 102 may transmit or display a warning message, and may interrupt the save process if applicable.

A DS node 107 may be configured to associate a LAP rule with a principal, and a LAP 106 may be configured to apply LAP rules to asset entities where the asset principal matches the rule principal.

A CS node 102 can be configured to allow attributing to a caller entity the rights to add, configure, activate, deactivate, delete and/or change the ranking of a LAP rule (administer LAP rules). In most examples, the CS node 102 can be configured to only allow attributing LAP rule administration rights to caller entities where the caller principal matches the rule principal.

A DC node 109 may be configured to maintain a list of LAP rules in memory for fast access. If the rule is implemented in a scripting language that allows for compilation, the LAP may be configured to compile a rule upon first population of the list. The LAP may be configured to group the list items by rule principal and sort rules by priority within each group. Other ways to group the list items and/or sort the rules may be provided and within the scope of the subject technology.

A LAP 106 receives tag read information from a RSP 105. Read information may be related to a single tag read or to multiple reads where, in some examples, all uniquely identified assets have the same principal. The LAP 16 obtains from a DS node 107 or DC node 109 (if available) the group of LAP rules where the rule principal matches the asset principal. For each tag read, the LAP 106 then iterates through the list of rules in the group in order of the highest priority being considered first. The LAP 106 processes the rule. If the rule's conditions are met, the LAP triggers the execution of the actions specified by the rule (change location, prepare or send email alert, etc.). If the rule conditions are not met, the LAP proceeds to processing the next rule. In most examples, processing ends after the first rule where all conditions have been met has been successfully executed.

When applying a command-style LAP rule, a LAP 106 uses any unique location identifiers provided to it as context information to determine the location for the uniquely identified asset. When applying a spatial LAP rule, a LAP 106 may use GPS or other coordinates received to help resolve a tag read to a location.

If a LAP rule allows for changing the location and the location has changed in comparison to what has previously been recorded in the system, the LAP 106 transmits to the DS node 107 the new location identifier, along with other useful information. This may include information about the source (e.g., reader 103), the date and time of the read and the caller, etc.

When storing a location change, a LAP 106 associates the asset entity with the location entity, if not already associated, and instructs DS 107 to persist the association, to reflect the new location for the asset. The DS 107 may be configured to maintain a history record of previous association of asset entity with location entity. In one example, the association of the asset entity to the location entity may not be persisted if the not at least one location's principal is the same as a principal of the asset to be moved.

In an embodiment, the LAP 106 may discard a move if the move is statistically improbable, using Bayes Theorem as criteria. For example, a move may be discarded if a reader has never processed an asset of the same class before. This would protect from moves executed based on faulty principal relations.

FIGS. 4, 5, 6, and 7 show example graphical user interfaces (GUIs) related to CS node 102 and for configuring the system in accordance with embodiments of the subject technology. Although a web browser example is used for purposes of explanation, it should be understood that various other types of interface in alternative environments can take advantage of aspects of the various embodiments.

Figure 8:
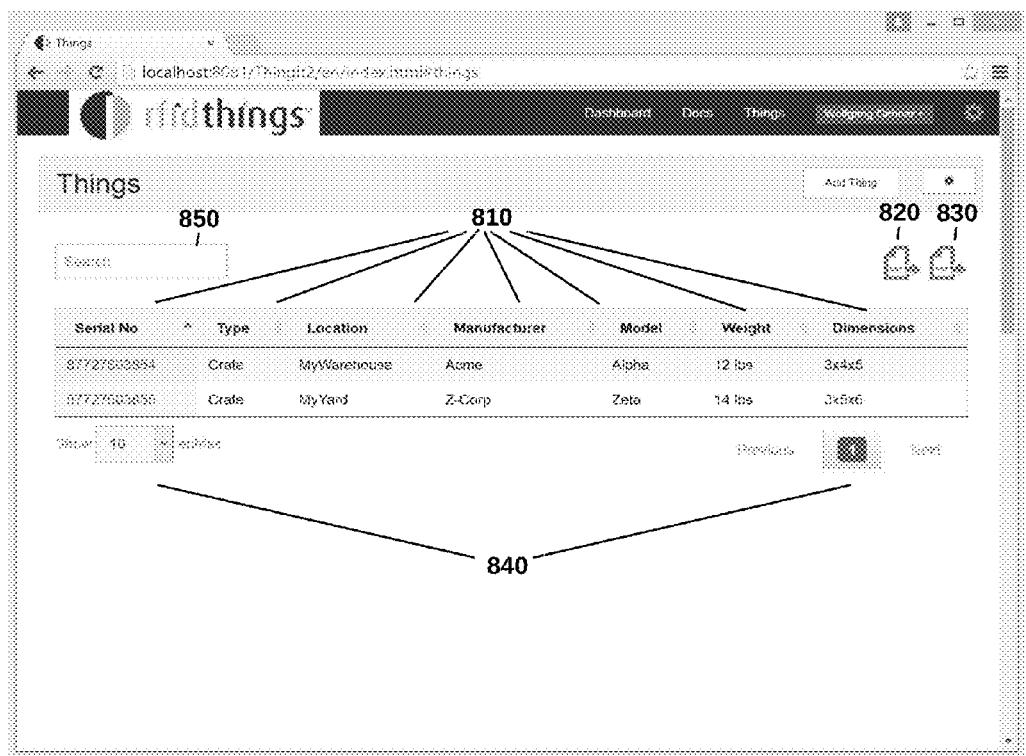
FIG. 8 conceptually illustrates an example graphical user interface for listing assets in accordance with at least one embodiment.

FIG. 8 shows an example graphical user interface (GUI) related to a report server (RS) node 101 and for retrieving data from the system. The example GUI in FIG. 8 shows a listing of assets with columns 810. It also includes buttons allowing a user to obtain a listing report in comma-separated value (CSV) 820 or portable document format (PDF) 830, a paging facility 840 and a search field 850.

Easy configuration is important for a multi-tenant RFID asset tracking system. To this end, embodiments of the subject technology provide interactive user interfaces to more easily configure aspects of the disclosed multi-tenant system. In a practical implementation, different tenants can be expected to track different types of assets in different types of locations. Each tenant can be expected to have unique needs to maintain and store meta-data about assets, locations and system users. For example, a tenant that tracks beer kegs may need to maintain the gross weight, net weight, fill type, last wash date etc. of each keg. A tenant that tracks pallets may need to maintain the manufacturer, model, dimensions and first date of service of each pallet. In an example operation, a single tenant can be expected to maintain up to one hundred custom asset attributes (data fields), in some examples even more. Some locations may have address meta-data, and some locations may have an inventory count per asset type. Some tenants may maintain phone numbers of system users, and some tenants may maintain the department name or department number of a user. To be useful, a multi-tenant asset tracking system should allow adding, configuring and deleting arbitrary data fields for assets, and possibly locations and users, per tenant. Both data field storage in DS nodes 107 and read/write access to these fields in interfaces such as CS nodes 102 and RS nodes 101 and in LAPs 106 should be easily configurable. Example graphical interfaces may be configurable to show, hide or rearrange attributes in lists, data entry and report screens for each tenant in an embodiment. The subject technology addresses the need for such configurability in the multi-tenant asset tracking system as described in the following disclosure.

Figure 4:
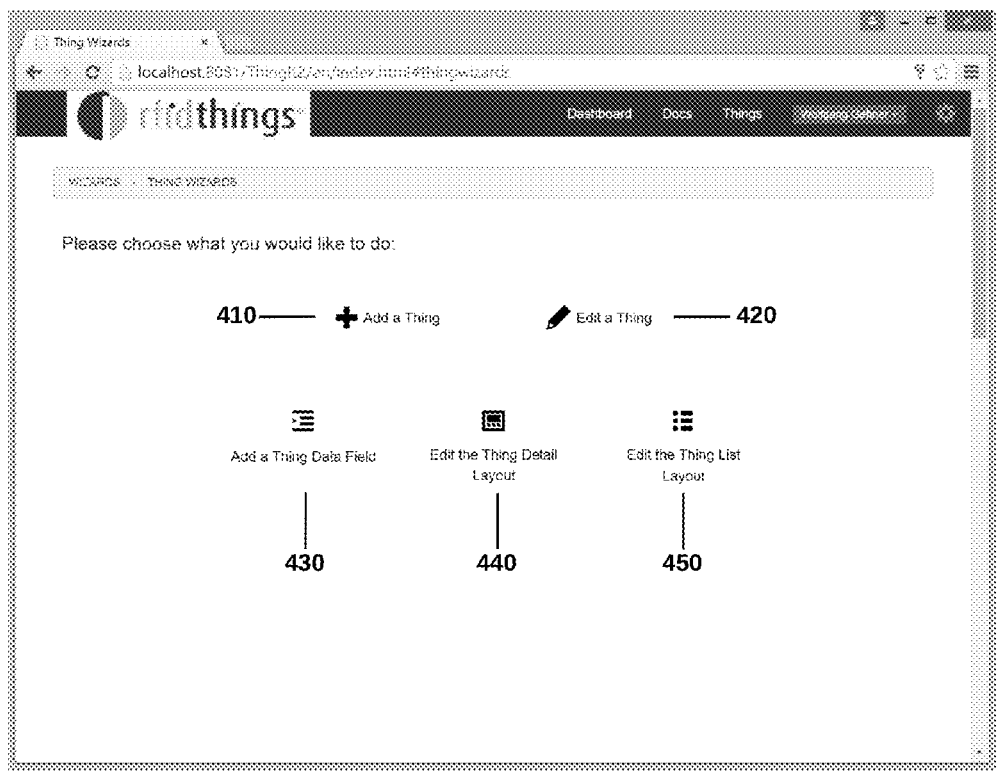
FIG. 4 conceptually illustrates an example graphical user interface for selecting an asset wizard in accordance with at least one embodiment.

FIG. 4 illustrates an example GUI with multiple options for invoking different functionality. The example GUI, as illustrated, may be provided by a CS node 102 for display in a web browser or any other suitable client. As shown, the GUI includes graphical elements 410, 420, 430, 440, and 450 that respectively correspond to an option that a user may invoke by selecting the graphical element. The graphical element 410 corresponds to an option to add an asset entity. The graphical element 420 corresponds to an option to modify asset entity data. In most examples, the CS node 102 is configured to display elements 410, 420 only to callers that have been attributed managerial rights. The graphical element 430 corresponds to an option to add a data field. The graphical element 440 corresponds to an option to edit a detail layout. The graphical element 450 corresponds to an option to edit a list layout. In most examples, the CS node 102 is configured to show elements 430, 440 and 450 only to callers that have been attributed administrative rights. The functions of elements 430, 440 or 450 are further discussed in the following disclosure.

In an embodiment, a DS node 107 can be configured to store a list of custom field entities. A field entity can represent or describe a user-defined field in the database. A field entity may contain attributes such as a label or default label (descriptor readable by a human), field name (machine-readable descriptor), a field data type (such as numeric, alphanumeric or date), a field format (such as a mask or precision indicator for a date format), an association with a principal, an association to an entity type or domain (such as asset, location or user) and/or an entity subtype or sub-domain (such as a certain class or type of asset, location, or user) and other meta-data. A CS node 102 may provide an interface to allow submitting such field entities and related commands to the DS node 107.

A CS node 102 may be configured to provide a field creation process ("field wizard") to add a field entity to the system, which may be provided for display in GUIs described herein. The field wizard may prompt for field attributes. The field wizard may auto-generate the field name based on a label provided by the user, and it may provide a visual cue indicating when a certain label or field name would constitute a duplicate within the domain or sub-domain. The field wizard can be configured to disallow storing such duplicate label or field name.

Figure 5:
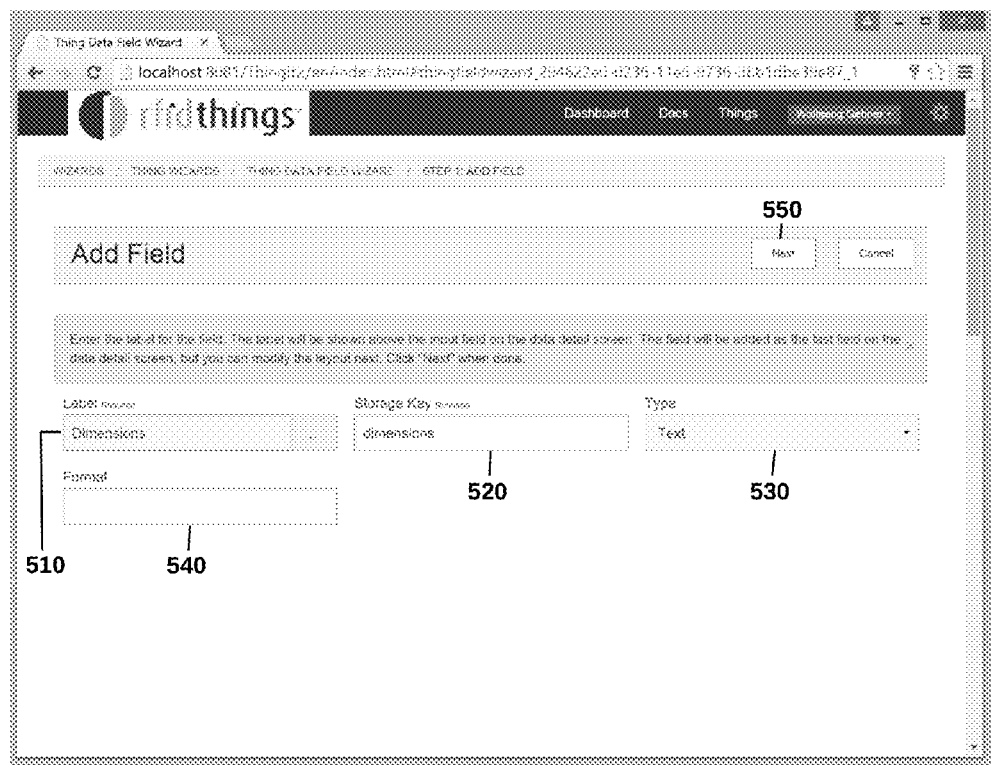
FIG. 5 conceptually illustrates an example graphical user interface for adding a user-defined field in accordance with at least one embodiment.

FIG. 5 illustrates an example GUI for adding a field entity and its attributes. The example GUI, as illustrated, may be provided for display in a web browser or any other suitable client. As shown, the GUI includes graphical elements 510, 520, 530, and 540 that correspond to different attributes of a new field entity to be added. The graphical element 510 corresponds to a text input box for providing a human-readable name or default label for the field. The graphical element 520 corresponds to a text input box for providing a machine-readable name (storage key) for the field. The graphical element 530 corresponds to a dropdown list for providing one or more types of data for selection. The graphical element 540 corresponds to a text input box for providing a format for the field. In this example, when a user clicks or taps on the "Next" button 550 (or a "Save" button on a GUI shown subsequently), the CS node 102 stores the information provided in a DS node 107 as part of the newly created field entity.

In an embodiment, when a DS node 107 receives the command to store an entity (such as asset, location or user entity) for which at least one custom field (field entity) is configured, the DS node 107 inspects the data for key-value pairs where the data key matches the machine-readable field name of the field entity and the principal matches the principal of the field entity. For each such match found, the DS nodes 107 stores the submitted key-value pair in the database. In an example, the storage space for such custom fields is grouped by data type (such as numeric, alphanumeric, date). When a DS node 107 receives the command to retrieve an entity for which at least one custom field is configured and both are associated to the same principal, the DS node 107 retrieves the key-value pairs where the keys match the field name of the applicable field entity and makes them part of the list of the key-value pairs for the retrieved entity before returning the entity to the caller.

Figure 7:
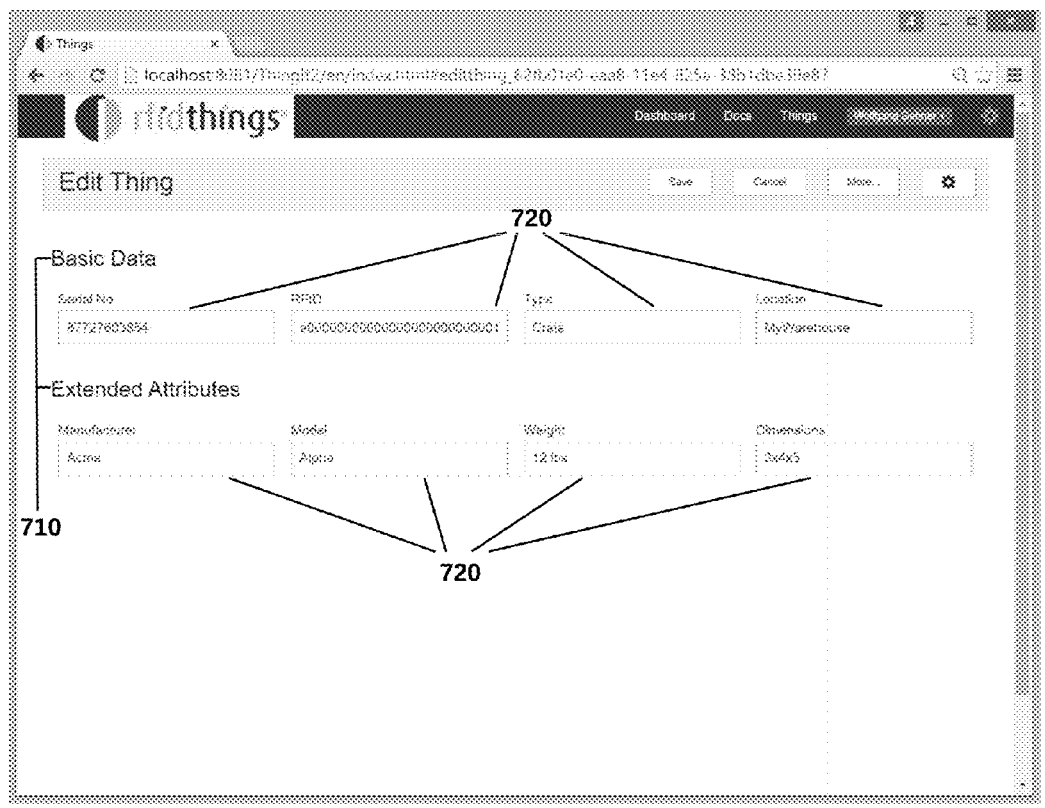
FIG. 7 conceptually illustrates an example graphical user interface for editing an asset entity in accordance with at least one embodiment.

In an embodiment, a DS node 107 can be configured to store a list of grid entities. A grid entity can represent the layout of fields in a data entry or display mask for a domain or sub-domain item in a GUI. An example for a data entry mask is shown in FIG. 7. A grid entity can also represent the layout of a list of domain or sub-domain items in a GUI. An example for a list of domain items is shown in FIG. 8. The grid entity defines which interface elements are to be rendered in which order and orientation on a client or rendering device. One each of mask layout and list layout may be designated as default per domain or sub-domain, by either convention or configuration. A CS node 102 may provide an interface to allow adding, configuring, activating, deactivating or deleting grid entities.

In an embodiment, a DS node 107 can be configured to store a list of interface element entities (tile entities). A tile entity can represent a header, sub-header or data field element (editable or not editable) with or without label in a data entry or display mask. A tile entity can also represent a column element with or without header in a list of domain or sub-domain items. In most examples, a DS node 107 can be configured to store an association of a tile entity with a field entity and an association with at least one grid entity. A tile entity may specify visual aspects of the interface element, such as font size, font face, label, whether a tile represents a header, sub-header, column, edit field, whether a column is sortable or editable etc. A CS node 102 may provide an interface to allow adding, sorting, arranging or otherwise configuring, activating, deactivating or deleting such tile entities, and associating or dissociating them to field entities and grid entities. In one embodiment, the CS node 102 provides a visual interface that allows drag-and-drop sorting or arranging of such tiles.

Figure 6:
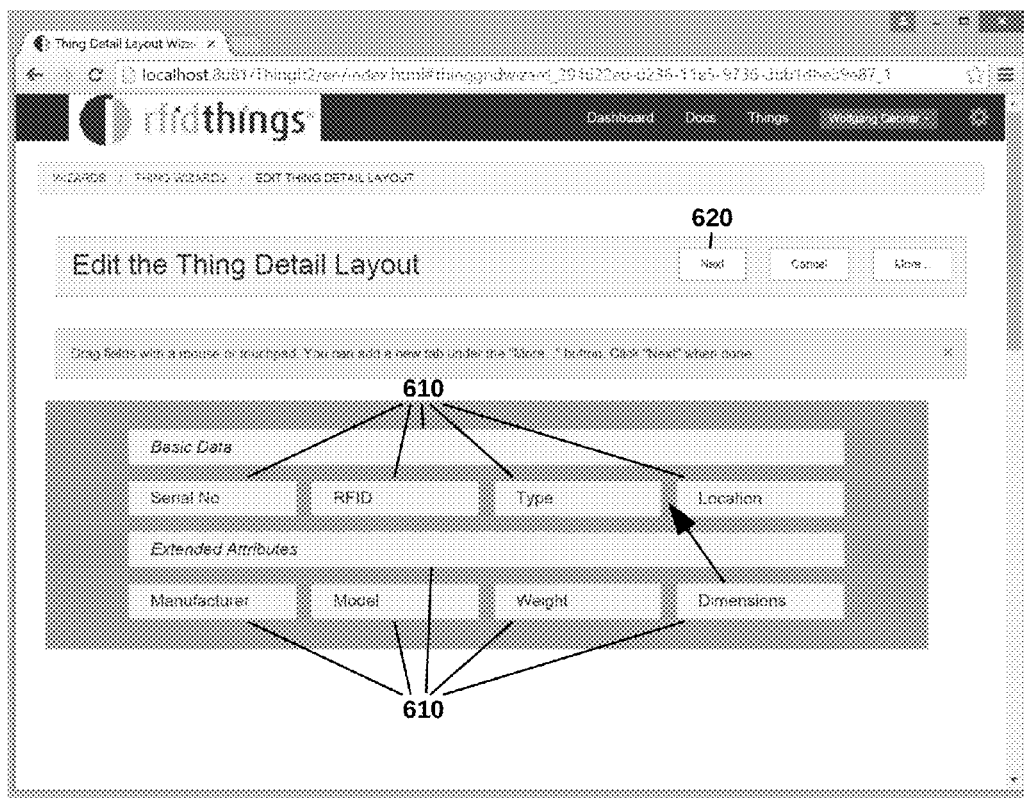
FIG. 6 conceptually illustrates an example graphical user interface for editing an asset detail layout in accordance with at least one embodiment.

FIG. 6 provides an example of a GUI that allows drag-and-drop arranging of one or more tiles 610 within a grid that represents a data entry mask. In an example, a user with administrative rights can access the GUI shown in FIG. 6 by clicking or tapping on element 440 shown in FIG. 4. In this example, when a user clicks or taps on the "Next" button 620 shown in FIG. 6 (or a "Save" button on a GUI shown subsequently), the CS node 102 stores the order and orientation of the tiles within the grid in a DS node 107. In the example GUI of FIG. 6, as indicated by the arrow, a tile at any tile location in the grid may be selected and then moved to a different tile location in the grid. Constraints to attempted moves such as "the first tile must be a sub-header" may apply.

A CS node 102 may be configured to provide a tile creation process ("tile wizard") to add a tile entity and associate it with a grid entity. In some examples, the field wizard may propose as a last processing step to enter a tile wizard. Information entered in the field wizard can then carry over to the tile wizard. For example, the default human-readable label of the field can be proposed as the label of the tile.

When a CS node 102 or an RS node 101 renders a grid (list or mask) in a user interface, it will first obtain from a DC node 109 or a DS node 107 the configuration of the grid as specified in grid entity and associated tile entities, and uses the configuration to render the interface in order, orientation and with other characteristics specified by the grid entity and its associated tile entities. When filling columns or mask fields with data coming in from a query to a DC node or DS node, the CS node or RS node uses the association of the tile entity with a field entity to retrieve the value from the key-value pair of the domain or sub-domain data where the key matches the field name for the same domain or sub-domain.

FIG. 7 illustrates an example GUI rendered by a CS 102 that has obtained mask layout information from the information stored as part of grid entity defined for this mask and associated tile entities, and has also filled the mask fields with data obtained in accordance with the associations of each tile entity with a field entity. As shown, the GUI includes elements such as sub-headers 710 and edit fields with labels 720. All elements correspond to tile entities defined and arranged within the (layout) grid. In an example, a user with managerial rights can access the GUI shown in FIG. 7 by clicking or tapping on element 420 shown in FIG. 4.

FIG. 8 illustrates an example GUI rendered by a report server RS 101 that has obtained list layout information from the information stored as part of a grid entity defined for this list and associated tile entities, and has also filled the columns 810 with data obtained in accordance with the associations of each tile entity with a field entity. The information, for instance, includes numerical data ("Serial No) and textual data ("Type", "Location", "Manufacturer", "Model", "Weight" and "Dimensions").

An example GUI provided by a CS 102 (not shown in provided FIGS) may allow sorting of columns, modification of column labels and setting other display properties of the list.

In an example, a CS node 102 or an RS node 101 is configured to provide field, grid, and/or tile configuration data in an interface provided to a machine caller. External clients may use this configuration data as layout instructions when rendering user interfaces in their graphical user interface technology of choice.

Figure 9:
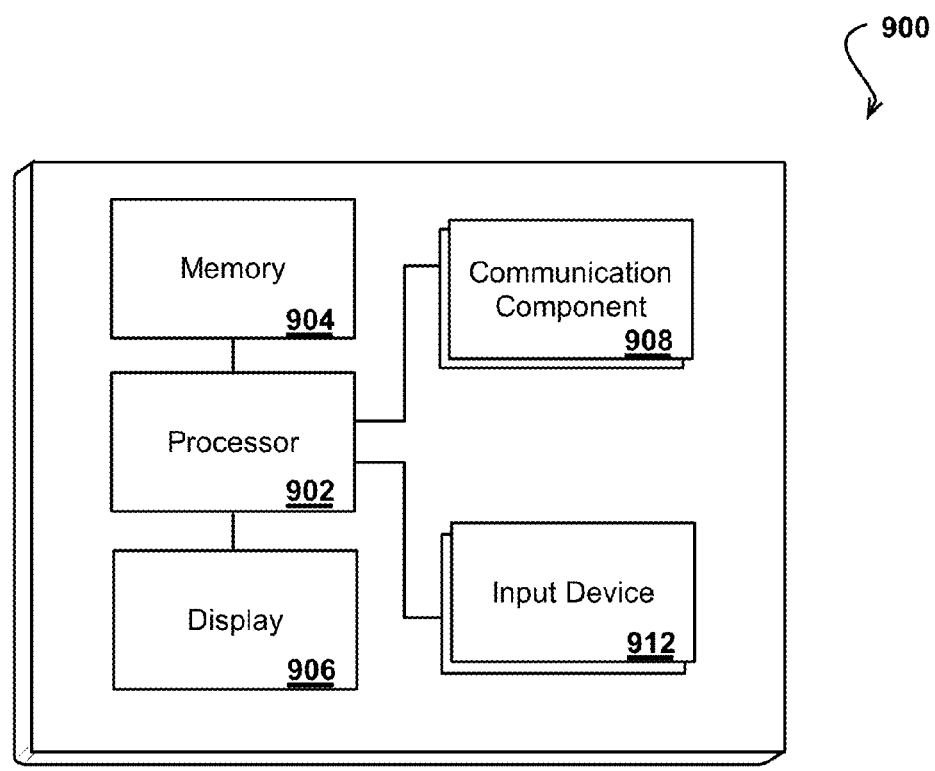
FIG. 9 illustrates example components of a client computing device in accordance with various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 912 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more communication components 908, such as a Wi-Fi, Bluetooth, RF, wired, or wireless communication system. The device in many embodiments can communicate with a network, such as the Internet, and may be able to communicate with other such devices.

Figure 10:
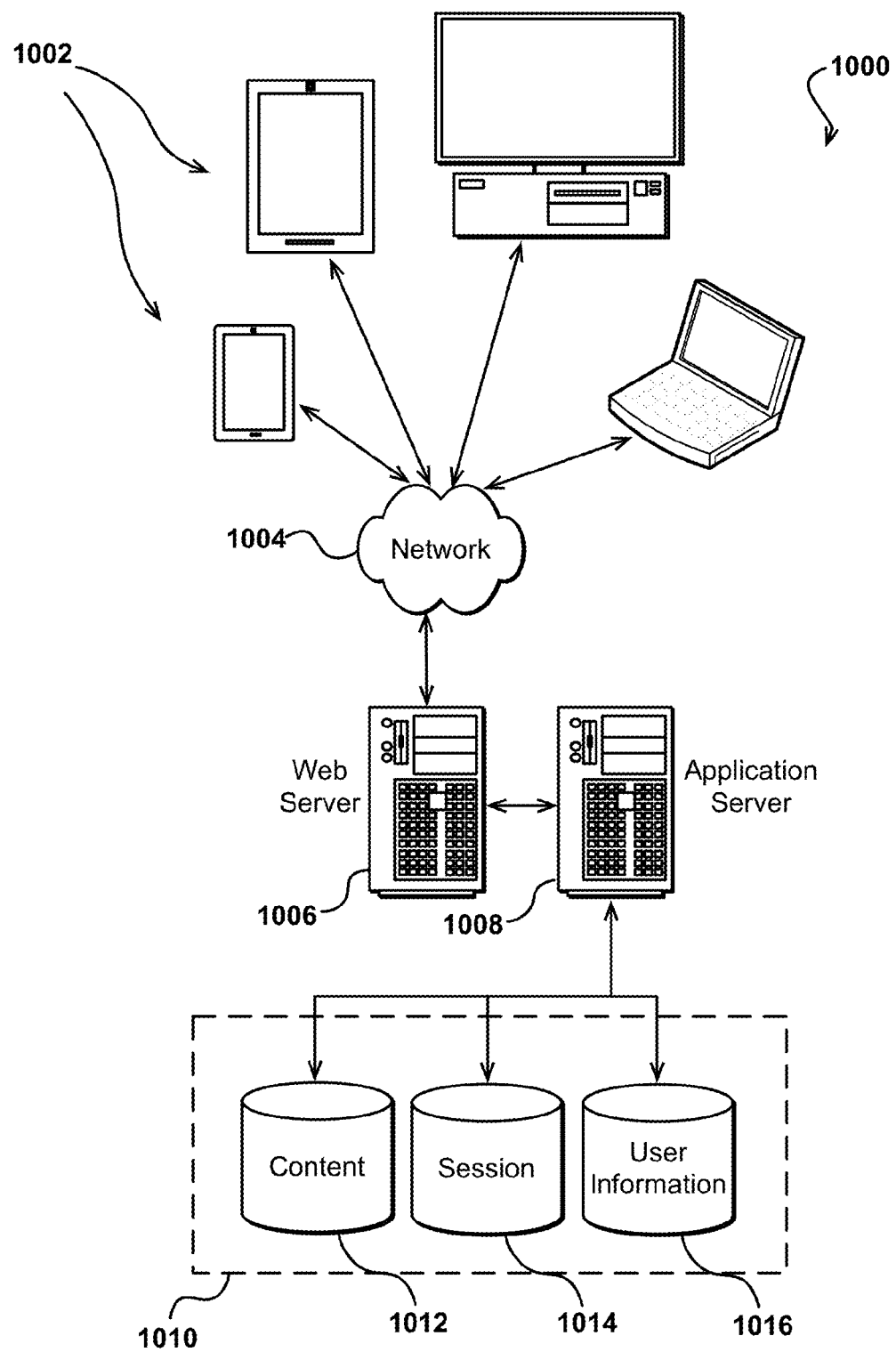
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof in this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services can communicate using any appropriate type of messaging, such as by using messages in JavaScript Object Notation (JSON) format and exchanged using an appropriate architecture style, such as representational state transfer (REST) using an appropriate protocol, such as HTTP or HTTPS. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be described in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as JavaScript, Perl, Python, or TCL, as well as combinations thereof. The server(s) may also include database servers, including without limitation those commercially available from Oracle®, Microsoft®, Sybase®, and IBM®. Database servers include servers that support queries structured using any variant of Structured Query Language (SQL) but also those that support other query types (NoSQL).

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

While various embodiments have been described above, it should be understood that they have been presented by way of example only, and not limitation. Thus, the breadth and scope of the present disclosure should not be limited by any of the above-described example embodiments, but should be defined only in accordance with the claims and their equivalents.

It should be understood that the figures highlighting the functionality and advantages of the present disclosure are presented for example purposes only. The present disclosure is sufficiently flexible and configurable, such that it can be utilized in ways other than that shown in the accompanying figures.

Further, the purpose of the Abstract is to enable the Patent Office and the public generally, especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the disclosure in any way.

What is claimed is:

1. A multi-tenant system for asset tracking using radio frequency identification (RFID) tags, comprising:
   at least one database server node (DS), the at least one DS node including at least one database;
   a plurality of RFID tags configured to be respectively attached to a corresponding plurality of assets, each RFID tag being configured to transmit an RFID tag ID code, the RFID tag ID code associated in the at least one DS node to one or more records of asset data describing a corresponding asset,
   wherein the plurality of RFID tags include a first tag that comprises a first RFID tag ID code and a second RFID tag that comprises a same RFID tag ID code as the first RFID tag ID code, the first RFID tag being associated with a first asset and the second RFID tag being associated with a second asset or an asset not represented in the multi-tenant system, and
   wherein the first asset is associated with a first principal and the second asset is associated with a second principal or no known principal, and the first RFID tag is reported by a first reader device in a first location and the second RFID tag is reported by a second reader device in a second location;
   at least one reader device configured to communicate with at least one of the RFID tags to obtain the RFID tag ID code and provide context information associated with the at least one reader device, wherein the context information includes at least one of reader device identification, location identifier, readpoint geo-location, or other coordinate information;
   at least one read scope processor (RSP) configured to disambiguate one or more tag reads of the plurality of RFID tags based at least in part on meta-data acquired from the DS node relating to the context information, and identify a respective asset, wherein a mapping between a reader device or a location to a principal is used to disambiguate an asset among the one or more tag reads of the plurality of RFID tags, the one or more tag reads including information indicating the first RFID tag and the second RFID tag having the same RFID tag ID code; and
   a location action processor (LAP) configured to determine location information for the respective asset identified by the RSP.

2. The system of claim 1, further comprising:
   at least one configuration server (CS) node configured to be connected to the at least one DS node, and to receive meta-data for storage in the DS node; and
   at least one report server (RS) node configured to be connected to the at least one DS node, display a plurality of user-selectable data queries corresponding to stored asset data, and search results for stored data that corresponds with a selected user-selectable data query.

3. The system of claim 2, wherein static content delivered by the at least one RS or the at least one CS is cached by at least one content delivery network (CDN).

4. The system of claim 2, wherein dynamic content delivered by the at least one RS node or the at least one CS node is cached on at least one Application Programming Interface/Remote Procedure Call(API/RPC) delivery network.

5. The system of claim 2, further comprising:
   at least one load balancer node, the at least one load balancer node configured to select, using at least one load balancing algorithm, a target node to handle a request from at least one of a reader device or client, the target node being a CS node, a RS node, or a RSP.

6. The system of claim 1, further comprising:
   at least one tag collision report filter (TCRF) node configured to, prior to submitting a command to store a tag ID code of an asset, validate whether the tag ID code is convertible to a unique identifier that indicates the tag ID code in association with the principal is not ambiguous in the system, and
   the at least one TCRF being further configured to query for at least one asset associated with a respective tag ID code that matches the tag ID code and the at least one asset further associated with a respective principal that is at least related to the principal or matches the principal.

7. The system of claim 1, further comprising:
   a plurality of DS nodes including a first storage device and a second storage device, the first storage device storing data, the second storage device storing a copy of the data, the data being recoverable in response to one of the first or second storage devices not functioning.

8. The system of claim 1, further comprising:
   a dispatcher configured to handle a failure event that occurs in the plurality of DS nodes, the dispatcher configured to switch communication to another DS node in response to a respective DS node failing.

9. The system of claim 1, further comprising:
   a database server node configured to store at least one reader entity where each reader entity represents a reader device.

10. The system of claim 1, further comprising:
   a database server node is configured to store at least one principal, wherein the at least one principal represents an organization, supply chain, workflow, or other unit, entity or grouping or other entity that is billed for services, or is used in filtering or disambiguating one or more tag ID codes, and the at least one principal is uniquely identified by a principal identifier.

11. The system of claim 1, further comprising:

a database server node configured to store at least one location entity, wherein the at least one location entity represents a location in which assets are tracked.

12. The system of claim 1, further comprising:

a database server node is configured to store at least one caller entity, wherein the at least one caller entity represents a person, machine, access credential or access profile, and the at least one caller entity is uniquely identified by at least one of an email address, IP address, URI, username or other unique identifier.

13. The system of claim 1, further comprising:

a database server node configured to store at least one asset, wherein the at least one asset is uniquely identified by an asset identifier, the at least one asset is uniquely identified by a tag ID code or by a combination of principal identifier and tag ID code.

14. The system of claim 1, further comprising:

a database server node is configured to store one or more principal to principal relationship.

15. The system of claim 1, further comprising:

a database server node configured to store one or more relationships between a reader and a principal, wherein each relationship enables sharing information received from the reader.

16. The system of claim 1 further comprising:

a database server node configured to store one or more relationships between a location and a principal, where each relationship enables sharing information relating to a location.

17. The system of claim 1, further comprising:

a database server node configured to store one or more relationships between a location and a reader device, wherein each relationship enables determining a location for a uniquely defined asset.

18. The system of claim 1, wherein the LAP is further configured to update the location information for the respective asset, provide an information update to a client or another software, change attributes of the respective asset, log a history record, or execute one or more rules that define a set of actions to be taken.

19. The system of claim 1, further comprising:

an unique identifier generator (UIG) configured to generate one or more unique identifiers, the one or more unique identifiers being used to respectively identify one or more principals.

20. The system of claim 1, wherein the RSP is further configured to determine whether the reader is associated with at least one principal, and in response to the reader being associated with the at least one principal, generate a list including a reference to the at least one principal, the at least one principal being considered as a subscriber to reads received by the RSP.

21. The system of claim 1, wherein the RSP is further configured to determine a first respective asset associated with a first tag read and a second different asset associated with a second tag read, the first tag read and the second tag read including an identical RFID tag ID code.

* * * * *